(12) United States Patent
Hansson

(10) Patent No.: US 11,011,895 B2
(45) Date of Patent: May 18, 2021

(54) PULL-IN HEAD FOR A HIGH VOLTAGE CABLE

(71) Applicant: NKT HV Cables AB, Lyckeby (SE)

(72) Inventor: Stefan Hansson, Holmsjö (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 16/611,395

(22) PCT Filed: May 7, 2018

(86) PCT No.: PCT/EP2018/061726
§ 371 (c)(1),
(2) Date: Nov. 6, 2019

(87) PCT Pub. No.: WO2018/206509
PCT Pub. Date: Nov. 15, 2018

(65) Prior Publication Data
US 2020/0144798 A1 May 7, 2020

(30) Foreign Application Priority Data
May 8, 2017 (EP) .................................... 17169879

(51) Int. Cl.
*H02G 15/04* (2006.01)
*H02G 1/08* (2006.01)
*H02G 1/10* (2006.01)

(52) U.S. Cl.
CPC ............... *H02G 1/081* (2013.01); *H02G 1/10* (2013.01)

(58) Field of Classification Search
CPC ............................ H02G 15/04; H02G 15/113
See application file for complete search history.

(56) References Cited

U.S. PATENT DOCUMENTS 1,909,344 A * 5/1933 Green ..................... F16G 11/02
 403/284
3,184,535 A * 5/1965 Worthington ............ H01R 4/20
 174/90

(Continued)

FOREIGN PATENT DOCUMENTS

CN 102361266 A 2/2012
CN 203326153 U 12/2013

(Continued)

OTHER PUBLICATIONS

Extended European Search Report Application No. EP 17 16 9879 Completed: Nov. 10, 2017;dated Nov. 17, 2017 8 pages.

(Continued)

*Primary Examiner* — Chau N Nguyen
(74) *Attorney, Agent, or Firm* — Whitmyer IP Group LLC

(57) ABSTRACT

A pull-in head for a high voltage cable provided with a multi-wire conductor having an end portion which is stepped and tapering, with a layer-by-layer exposure of the wires in the direction towards the end face of the multi-wire conductor, wherein the pull-in head includes: a conductor clamp assembly having a plurality of clamping segments, wherein each clamping segment has an axial first central channel configured to receive the multi-wire conductor, wherein at least some of the clamping segments have mutually differing central channel width and central channel depth dimensions, the clamping segments being configured to be arranged one after the other in an order with a decreasing central channel width and central channel depth dimension, the central channel width and central channel depth dimensions being adapted to the tapering stepped configuration of the multi-wire conductor, whereby the first central channels together form a multi-wire conductor channel which is tapering in an axial direction, and wherein each clamping segment is configured to provide individual clamping of the multi-wire (Continued)

conductor, and a hollow lifting head configured to receive the conductor clamp assembly, wherein the conductor clamp assembly includes a support structure, wherein the clamping segments are configured to be assembled with the support structure to thereby clamp the multi-wire conductor between the clamping segments and the support structure.

16 Claims, 3 Drawing Sheets

(56) References Cited

U.S. PATENT DOCUMENTS

| | | | |
|---|---|---|---|
| 3,829,937 A | 8/1974 | Metzler | |
| 5,080,593 A * | 1/1992 | Neumann | B23K 9/323 439/18 |
| 6,431,216 B1 * | 8/2002 | Briscoe | F16L 55/17 138/110 |
| 7,311,553 B2 * | 12/2007 | Tamm | H01R 4/20 439/584 |
| 7,874,881 B1 * | 1/2011 | Sosa | H01R 4/188 439/877 |
| 9,246,282 B1 * | 1/2016 | Sovel | H01R 9/05 |
| 2008/0142243 A1 * | 6/2008 | Bird | H02G 15/113 174/92 |
| 2016/0336682 A1 * | 11/2016 | Markefka | H01R 13/5804 |

FOREIGN PATENT DOCUMENTS

| | | |
|---|---|---|
| CN | 104300442 A | 1/2015 |
| CN | 104300442 B | 8/2016 |
| GB | 317069 A | 5/1930 |
| GB | 332127 A | 7/1930 |
| WO | 2017005278 A1 | 1/2017 |

OTHER PUBLICATIONS

International Search Report and Written Opinion of the International Searching Authority Application No. PCT/EP2018/061726 Completed: Jul. 9, 2018; dated Jul. 17, 2018 14 pages.
European Office Action Applicatiion No. 17169879.8 Completed: Mar. 24, 2020 6 Pages.

* cited by examiner

PULL-IN HEAD FOR A HIGH VOLTAGE CABLE

TECHNICAL FIELD

The present disclosure generally relates to high voltage cables. In particular it relates to a pull-in head for a high voltage cable, to an assembly comprising a high voltage cable and a pull-in head, and to a method of assembling a pull-in head with a high voltage cable.

BACKGROUND

During for example a cable laying procedure a high voltage marine cable may be pulled from a marine vessel for storage on the sea bed until final installation on the platform or at landfall. There are several tools that may be used for pulling a high voltage marine cable in these situations. Examples of such tools are Chinese fingers and pull-in heads. Chinese fingers may not be able to hold the weight of a high voltage marine cable for installations in deep-water and ultra-deep-water and may be unsafe when pulled through a narrow J-tube.

A pull-in head may be more suitable in the situations mentioned above. A pull-in head which requires high pulling force is typically locked to the high voltage marine cable using both the armor wires and the conductor thereof. In order to obtain a better grip of the conductor, if a multi-wire conductor is used, a resin may be injected into the pull-in head. After hardening of the resin, a better grip of the multiple wires of the conductor may potentially be obtained. The pulling force can thus better be transferred to the entire conductor. A drawback with the use of a resin for transferring force from the cable to the pull-in head is that the filling process requires careful control of a number of parameters to obtain a reliable filling, hardening with the intended strength. It is also difficult to afterwards asses how successful the filling process has been and whether the casting meets the requirements. Moreover, the filling and hardening process is time-consuming and may require special measures to protect against the toxic gases released during the process.

SUMMARY

In view of the above, an object of the present disclosure is to provide a pull-in head for high pulling force applications, which solves or at least mitigates the problems of existing solutions.

There is hence according to a first aspect of the present disclosure provided a pull-in head for a high voltage cable provided with a multi-wire conductor, wherein the pull-in head comprises: a conductor clamp assembly comprising a plurality of clamping segments, wherein each clamping segment has an axial first central channel configured to receive the multi-wire conductor, wherein at least some of the clamping segments have mutually differing central channel width and central channel depth dimensions, the clamping segments being configured to be arranged one after the other in an order with a decreasing central channel width and central channel depth dimension, whereby the first central channels together form a multi-wire conductor channel which is tapering in an axial direction, and wherein each clamping segment is configured to provide individual clamping of the multi-wire conductor.

The end portion of the multi-wire conductor shall be arranged in a stepped manner. In particular, the multi-wire conductor should be arranged tapering, with a layer-by-layer exposure of the wires in the direction towards the end face of the multi-wire conductor.

The clamping segments have central channel width and depth dimensions that are adapted to the tapering stepped configuration of the multi-wire conductor. A clamping segment which is configured to receive a portion of the tapering multi-wire conductor which is wider, i.e. contains more layers of wires, has a first central channel with larger central channel width and central channel depth dimensions than a clamping segment that is configured to receive a narrower portion of the tapering multi-wire conductor.

By means of the clamping segments, which in a mounted state have the first central channels forming the tapering multi-wire conductor channel, each layer of the multi-wire conductor may be individually clamped. Since all the layers of the multi-wire conductor may be individually clamped by the clamping segments, the pulling force from the high voltage cable, and in particular from the multi-wire conductor, is better transferred to the pull-in head as there will be no sliding motion between the different layers of wires of the multi-wire conductor. Thus, by means of the present construction, both pulling forces and torsional forces will be transmitted more efficiently from the high voltage cable to the pull-in head.

The first central channel of each clamping segment extends along the entire axial extension of the clamping segment in question, i.e. from one axial end to the opposite axial end thereof.

The high voltage cable may for example be a high voltage armored cable. Alternatively the high voltage cable may be provided without armor. The high voltage cable may for example be a high voltage marine cable, with or without armor.

Typically, there is provided only one clamping segment for each layer or diameter of the stepped tapering multi-wire conductor. According to another variation, there may be several clamping segments provided for each layer or diameter of the stepped tapering multi-wire conductor.

According to one embodiment, the first central channel of the clamping segments may be provided with an uneven surface. The uneven surface is configured to improve the grip with the multi-wire conductor. The uneven surface may for example comprise grooves or ribs. The grooves or ribs may extend in the tangential direction and/or in the axial direction of a clamping segment.

According to one embodiment each clamping segment has a constant central channel width and central channel depth dimension. Thus, even though the central channel width and depth of two clamping segments may be mutually different, the central channel depth and central channel width of each clamping segment is constant. In case the multi-wire conductor has a stepped tapering configuration, it can thus be ensured that the first central channel of a clamping segment can be in mechanical contact with the corresponding portion of the multi-wire conductor along the entire axial length of the first central channel thereof.

According to one embodiment the conductor clamp assembly includes a support structure, wherein the clamping segments are configured to be assembled with the support structure to thereby clamp the multi-wire conductor between the clamping segments and the support structure.

The support structure hence acts as an axially extending support to which the clamping segments may be attached. Each clamping segment may be individually attached or mounted to the support structure.

According to one embodiment the support structure has an inner surface configured to face the clamping segments, which inner surface is provided with an axial second central channel having a stepped structure in the axial direction of the conductor clamp assembly. The second central channel, i.e. the central channel of the support structure, is configured to receive the multi-wire conductor.

The support structure may form one half of a rotation symmetric conductor clamp assembly. The clamping segments may form the other half of the conductor clamp assembly. In this manner, the multi-wire conductor may be arranged centrally inside the conductor clamp assembly.

As an alternative to the support structure, each clamping segment may comprise two halves, each half being provided with a first central channel. The halves are configured to be mounted or attached to each other with the first central channels facing each other, thus forming a clamping segment. In this variation, the multi-wire conductor is configured to be received between pairs of clamping segment halves.

Each pair of clamping segment halves may be arranged one after the other in the axial direction. Subsequent or adjacent pairs of clamping segment halves may be mechanically connected to each other to prevent relative rotation between the clamping segments.

According to one embodiment the first central channels and the second central channel define a circumferentially closed channel that is tapering in a stepped manner in the axial direction.

According to one embodiment the support structure is provided with a plurality of pairs of lateral radial grooves, each pair of lateral radial groove being configured to mate with a respective clamping segment. The radial grooves may increase the mechanical strength of the conductor clamp assembly. In particular, this mating configuration may ensure that the clamping segments maintain their axial position relative to the support structure during high pulling forces.

One embodiment comprises a plurality of fastening members, each fastening member being configured to attach a respective clamping segment to the support structure. The fastening members may for example be bolts or screws.

One embodiment comprises a connection flange structure having a flange and a collar, wherein the collar is provided with a distal portion relative to the flange and a proximal portion relative to the flange, the distal portion being configured to be soldered to a metal sheet of the high voltage cable, and the proximal portion being configured to be welded to armor wires of the high voltage cable. The envelope surface of the end portion of the high voltage cable may be sealed in a water-tight manner due to the soldering of the metal sheet to the distal portion. The welding of the armor wires to the proximal portion is for transferring the pulling force from the high voltage cable to the pull-in head during a pulling operation.

One embodiment comprises a hollow lifting head configured to receive the conductor clamp assembly, the lifting head having a base configured to receive the conductor clamp assembly.

According to one embodiment the lifting head has a base configured to be assembled with the connection flange structure.

One embodiment comprises a sealing member configured to provide a water-tight sealing between the connection flange structure and the lifting head. The high voltage cable end face may thereby be sealed in a water-tight manner.

According to one embodiment the sealing member is an O-ring.

There is according to a second aspect provided an assembly comprising a high voltage cable having a multi-wire conductor which at one end is arranged in a stepped tapering configuration, and a pull-in head according to the first aspect presented herein, wherein the pull-in head is mounted to that end portion of the high voltage cable which is provided with the multi-wire conductor with the stepped tapering configuration.

There is according to a third aspect of the present disclosure provided a method of assembling a pull-in head with a high voltage cable having a multi-wire conductor, wherein the method comprises: b) providing a conductor clamp assembly around the multi-wire conductor, which multi-wire conductor has a stepped tapering configuration in the axial direction of the high voltage cable to expose layer for layer wires of the multi-wire conductor in a stepped manner, wherein the conductor clamp assembly comprises a plurality of clamping segments, each clamping segment having an axial first central channel configured to receive the multi-wire conductor, wherein at least some of the clamping segments have mutually differing central channel width and central channel depth dimensions, the clamping segments being configured to be arranged one after the other in an order with a decreasing central channel width and central channel depth dimension in the axial direction, wherein the first central channels together form a multi-wire conductor channel which is tapering in an axial direction, wherein in step b) the multi-wire conductor is along its stepped tapering configuration arranged in first central channels of corresponding central channel width and central channel depth dimensions, e) fixating the clamping segments to each layer of wires of the multi-wire conductor, and f) providing a hollow lifting head around the conductor clamp assembly.

In step e) each layer of wires of the multi-wire conductor is fixated with a clamping segment.

One embodiment comprises a) providing a connection flange structure around the end portion of the high voltage cable, the connection flange structure having a flange, and a collar provided with a distal portion relative to the flange and a proximal portion relative to the flange, c) soldering a metal sheet of the high voltage cable to the distal portion, and d) welding armor wires of the high voltage cable to the proximal portion, wherein step f) further comprises assembling the lifting head with the connection flange structure in a water-tight manner.

According to one embodiment step f) involves placing a sealing member between the connection flange structure and the lifting head.

According to one embodiment step e) is performed after step b) but before step c). The order of the fixation of the layers of the multi-wire conductor may hence be made before the soldering and welding steps or after them. In fact, step e) could even be performed between step c) and d) if so desired.

Generally, all terms used in the claims are to be interpreted according to their ordinary meaning in the technical field, unless explicitly defined otherwise herein. All references to a/an/the element, apparatus, component, means, etc., are to be interpreted openly as referring to at least one instance of the element, apparatus, component, means, etc., unless explicitly stated otherwise. Moreover, any steps of the method presented herein need not necessarily be performed in the described order, unless explicitly stated so.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
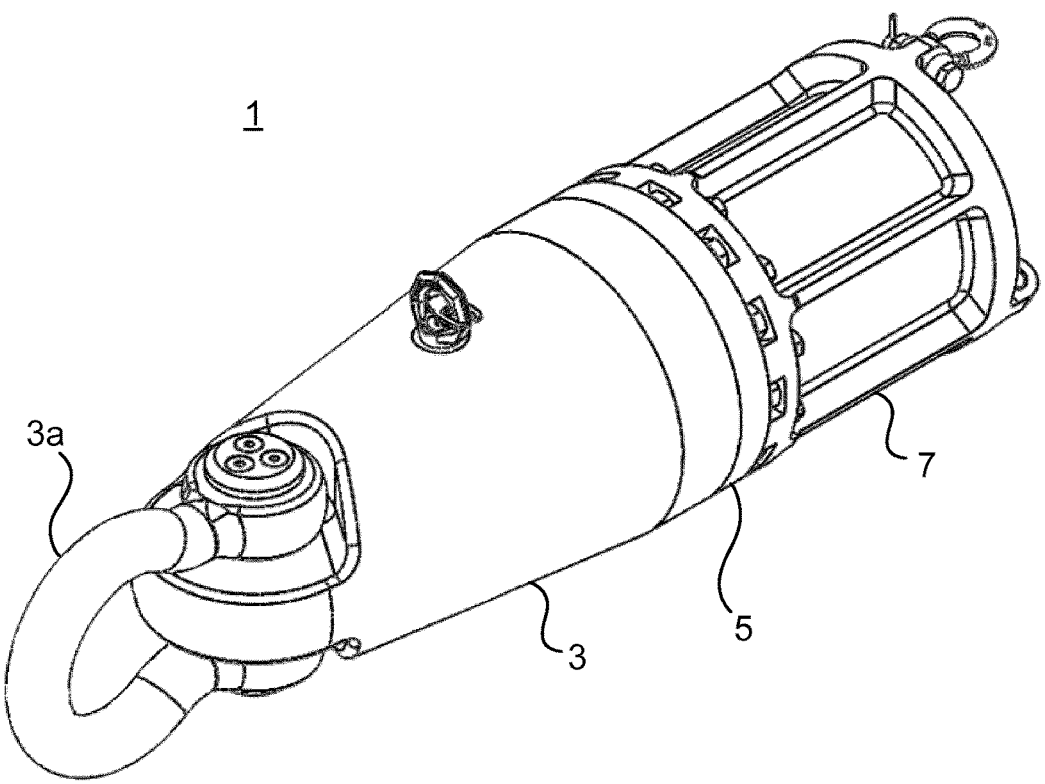
FIG. 1 shows a perspective view of an example of a pull-in head.

FIG. 1 shows an example of a pull-in head 1 for a high voltage cable. The pull-in head 1 is configured to be mounted to a high voltage cable. The exemplified pull-in head 1 comprises a hollow lifting head 3 which at its tip is provided with an engagement member 3a to which an engagement means, such as a hook, may be connected for pulling the high voltage cable with which the pull-in head 1 is assembled. The exemplified pull in head 1 also comprises a connection flange structure 5 and a support body 7. The lifting head 3 is configured to be mechanically connected to the connection flange structure 5. The connection flange structure 5 is configured to be mechanically connected to the support body 7.

Figure 2:
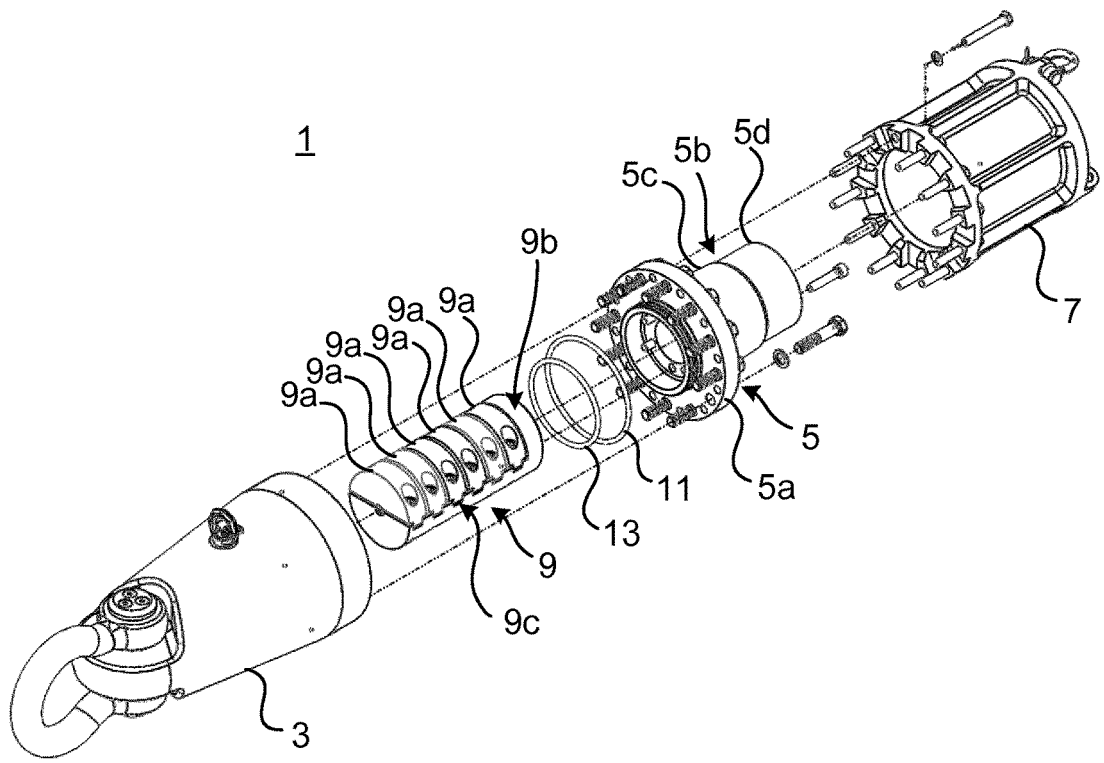
FIG. 2 shows an exploded view of the pull-in head in FIG. 1.

FIG. 2 shows the pull-in head 1 in an exploded view. The pull-in head 1 further comprises an elongated conductor clamp assembly 9. The conductor clamp assembly 9 is configured to be mechanically attached to the connection flange structure 5. The conductor clamp assembly 9 comprises a plurality of clamping segments or clamping members 9a. The conductor clamp assembly 9 has a base portion 9b. The conductor clamp assembly 9 has a support structure 9c extending from the base portion 9b in an axial direction of the elongated conductor clamp assembly 9. The clamping segments 9a are configured to be arranged one after the other in the axial direction away from the base portion 9b. The clamping segments 9a are configured to be mechanically attached to the support structure 9c. The clamping segments 9a are hence configured to be arranged axially aligned with each other when mounted to the support structure 9c. Each clamping segment 9a is configured to be individually attached to the support structure 9c. The conductor clamp assembly 9 is configured to receive a multi-wire conductor of a high voltage cable between the clamping segments 9a and the support structure 9c, as will be elaborated upon in more detail below.

The connection flange structure 5 comprises a flange 5a and a collar 5b extending axially from the flange 5a. The collar 5b has a proximal portion 5c relative to the flange 5a. The collar 5b has a distal portion 5d relative to the flange 5a and the proximal portion 5c. The proximal portion 5c has a larger diameter than the distal portion 5d. The proximal portion 5c is configured to be welded to the armor wires of a high voltage cable. The distal portion 5d is configured to be soldered to a metal sheet, for example a lead sheet, of a high voltage cable.

The support body 7 is cylindrical and configured to receive an end portion of a high voltage cable. The lifting head 3, the connection flange structure 5 and the support body 7 are configured to be arranged coaxially. The connection flange structure 5 is configured to be arranged between the lifting head 3 and the support body 7.

The lifting head 3 is configured to receive the conductor clamp assembly 9. The lifting head 3 is configured to be mounted in a water-tight, or waterproof, manner to the connection flange structure 5. The conductor clamp assembly 9 is hence protected from water by means of the water-tight sealing between the lifting head 3 and the connection flange structure 5. To this end, the pull-in head 1 may also comprise one or more sealing members 11 and 13 configured to be arranged between the lifting head 3 and the connection flange structure 5. The one or more sealing members 11 and 13 may for example be O-rings.

Figure 3:
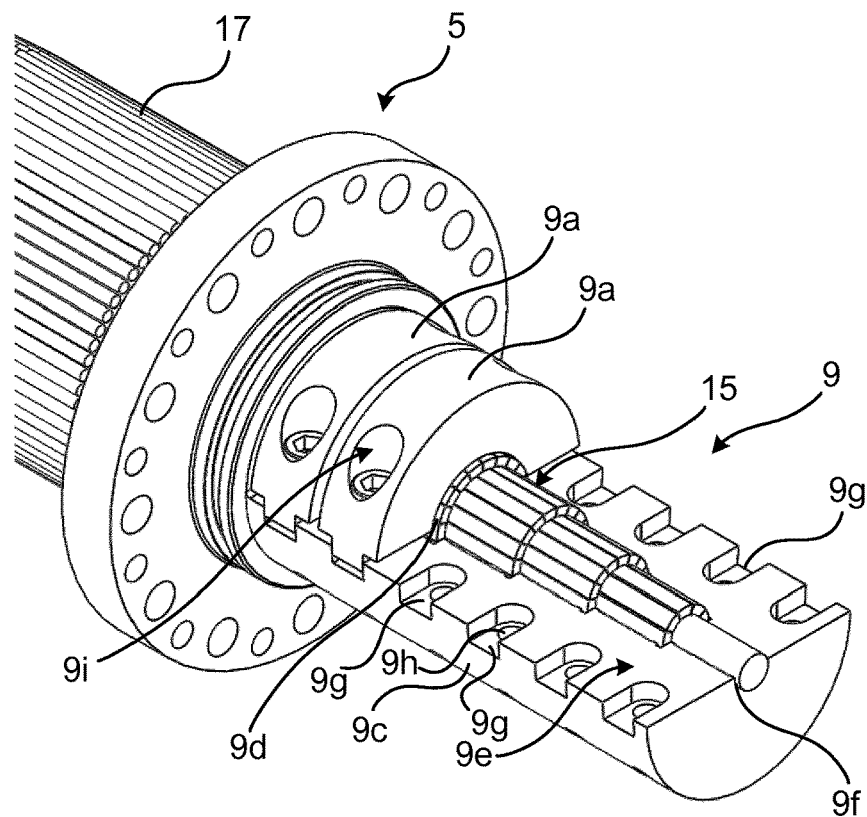
FIG. 3 shows a perspective view of a high voltage cable provided with the pull-in head in FIG. 1.

Turning now to FIG. 3, a close-up view of the conductor clamp assembly 9 is shown when mounted to the connection flange structure 5. In FIG. 3 a plurality of the clamping segments have been removed with only two clamping segments 9a remaining to better illustrate the structure of the conductor clamp assembly 9. Furthermore, as can be seen, armor wires 17 of a high voltage cable have been welded to the proximal portion 5c of the collar 5b.

Each clamping segment 9a has an axial first central channel 9d. The first central channel 9d extends from one axial end to the other axial end of a clamping segment 9a. The first central channels 9d are hence through-extending channels. Each first central channel 9d is configured to receive a portion of a multi-wire conductor of a high voltage cable. When the clamping segments 9a are mounted to the support structure 9c the first central channels 9d of all the clamping segments 9a are axially aligned. The first central channels 9d hence form a multi-wire conductor channel.

The first central channel 9d of each clamping segment 9a has a constant central channel width dimension and a constant central channel depth dimension. The clamping segments 9a have mutually differing central channel width and depth dimensions. In particular, the clamping segments 9a are mounted to the support structure 9c in such a manner that the central channel width and central channel depth dimensions of the clamping segments 9a decrease in the axial direction away from the base portion 9b. The multi-wire conductor channel formed by the first central channels 10 of the clamping segments 9a is hence tapering in the axial direction away from the base portion 9b towards the tip of the support structure 9c. The multi-wire conductor channel is tapering in a stepped manner due to the constant central channel width and depth dimensions of the clamping segments 9a.

The support structure 9c has an inner surface 9e configured to face the clamping segments 9a when the clamping segments 9a are mounted to the support structure 9c. The inner surface 9e may for example be a planar surface. The inner surface 9e may be provided with an axial second central channel or groove 9f. The second central channel 9f has a stepped tapering structure or configuration in the axial direction of the conductor clamp assembly 9. Each step of the second central channel has a width and depth dimension that corresponds to the width and depth dimensions of one of the clamping segments 9a. Thus, when a clamping segment 9a is assembled with the support structure 9c at its correct axial location, the width and depth dimension of the first central channel 9d of the clamping segment 9a in question and the width and depth dimensions of the corresponding portion of the second central channel 9f, will match.

Figure 5:
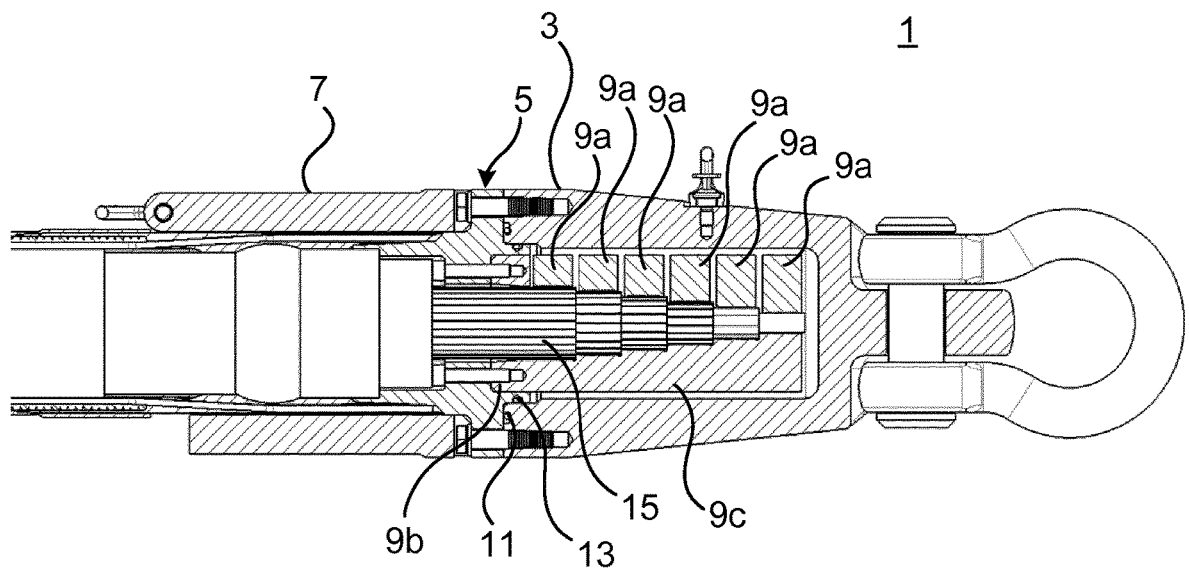
FIG. 5 shows another view of the configuration shown in FIG. 4.

The first central channels 9d and the second central channel 9f define a circumferentially closed channel that is tapering in a stepped manner in the axial direction away from the base portion 9b. A multi-wire conductor 15 of a high voltage cable having a corresponding stepped tapering configuration may thus be clamped between the clamping segments 9a and the support structure 9c, as illustrated in FIG. 5.

In the example shown in FIG. 3 the support structure 9c is provided with a plurality of pairs of lateral radial grooves 9g. The lateral radial grooves 9g are radially aligned in pairs. The lateral radial grooves 9g are configured to mate with a respective clamping segment 9a. To this end, each clamping segment 9a may for example be provided with teeth configured to engage with a pair of radially aligned lateral radial grooves 9g.

The clamping segments 9a are configured to be attached/mounted to the support structure 9c by means of fastening members. Such fastening members may for example be bolts, screws or any other suitable means. Each clamping segment 9a is configured to be individually attached to the support structure 9c. It is thereby possible to control the amount of clamping of each segment or stepped portion of the multi-wire conductor 15.

In the example shown in FIG. 3, each lateral radial groove 9g is provided with an opening 9h configured to receive a fastening member. The clamping segments 9a are provided with corresponding through-openings 9i configured to receive a fastening member, each being configured to be aligned with a respective opening 9h.

Figure 4:
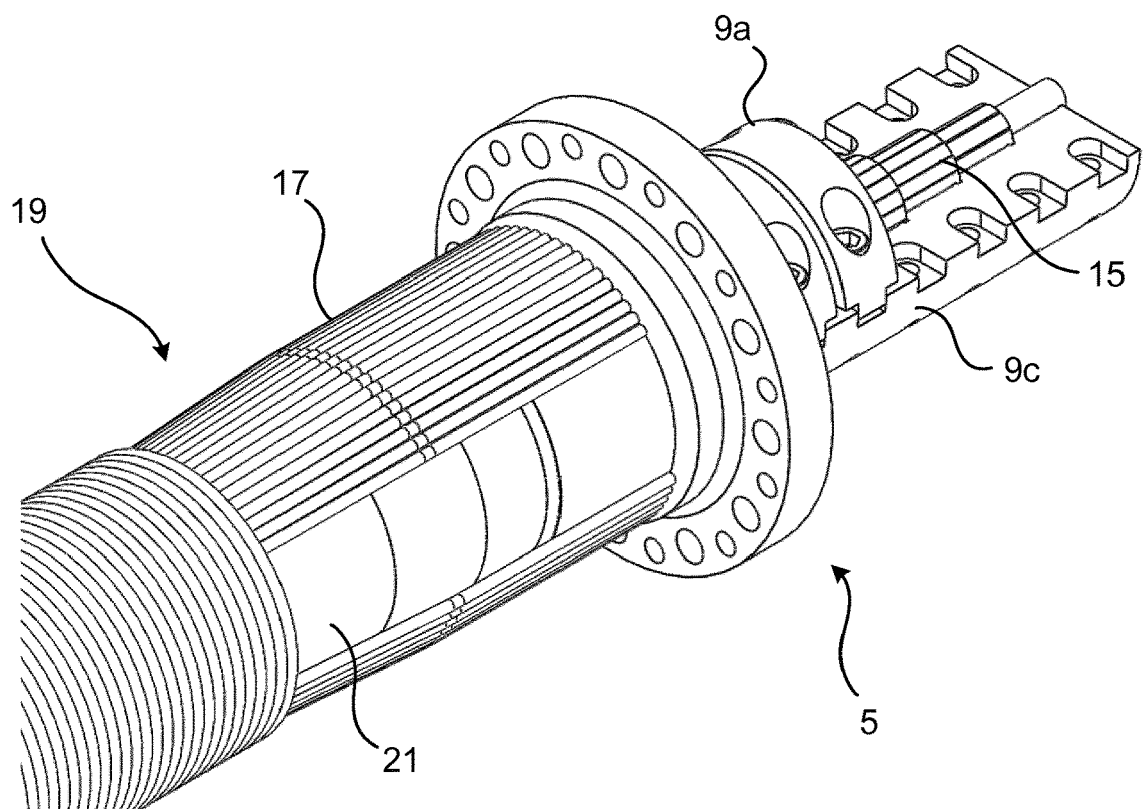
FIG. 4 shows a perspective view of the pull-in head with the lifting head removed to expose the interior of the pull-in head.

FIG. 4 illustrates the configuration shown in FIG. 3 from another angle. A high voltage cable 19 is attached to the connection flange structure 5. In particular, as mentioned above, the armor wires 17 have been welded to the proximal portion 5c of the collar 5b. The distal portion 5d has a smaller diameter than the proximal portion 5c. An inner metal sheet 21 or layer, typically a lead sheet, of the high voltage cable 19 may thus be soldered to the distal portion 5d radially inside the welded armor wires 17 to obtain a water-tight sealing at the interface between the collar 5b and the high voltage cable 19. It is to be noted that during assembly, the soldering, for natural reasons, should be performed before the welding as will be explained in more detail in the following.

FIG. 5 shows a longitudinal section of an assembly comprising the pull-in head 1 assembled with the high voltage cable 19. It can be seen that the base portion 9b of the conductor clamp assembly 9 is assembled with the connection flange structure 5 by means of fastening members. Moreover, the multi-wire conductor 15 has been prepared in a stepped configuration, tapering in a direction towards the end of the high voltage cable 19. Each layer of wires of the multi-wire conductor 15, which corresponds to a step of the tapering multi-wire conductor 15, extends between a respective clamping segment 9a and the support structure 9c. This results in that each layer of wires of the multi-wire conductor 15 may be fixated and clamped. There will hence be no relative sliding of wires in different layers.

Figure 6:
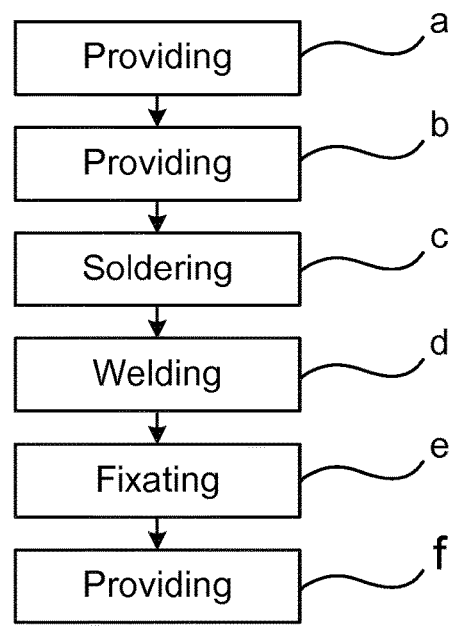
FIG. 6 is a flowchart depicting a method of assembling the pull-in head in FIG. 1 with a high voltage cable.

With reference to FIG. 6, an example of a method of assembling the pull-in head with the high voltage cable 19 will now be described. The exemplified high voltage cable 19 comprises a conductive core including the multi-wire conductor 15, an insulation system provided radially outwards of the multi-wire conductor 15, the metal sheet 21 arranged radially outwards of the insulation system, and, in the axial direction of the high voltage cable 19, helically arranged armor wires 17 provided radially outwards of the metal sheet 21. A multi-wire conductor is a conductor which is formed by a plurality of wires arranged in a layered configuration.

In a step a) the connection flange structure 5 is placed around the end portion of the high voltage cable 19.

The support body 7 may be placed around the end portion of the high voltage cable 19 before the connection flange structure 5.

In a step b) the conductor clamp assembly 9 is provided around the multi-wire conductor 15.

In a step c) the metal sheet 21 of the high voltage cable 19 is soldered to the distal portion 5d of the connection flange structure 5.

In a step d) the armor wires 17 of the high voltage cable 19 are welded to the proximal portion 5c of the connection flange structure 5.

In a step e) each layer of the multi-wire conductor 15 is fixated or clamped by means of a respective one of the clamping segments 9a.

In a step f) the lifting head 3 is provided around the conductor clamp assembly 9 and the lifting head 3 is assembled with the connection flange structure 5 in a water-tight manner.

It is to be noted that step e) may alternatively be performed between steps b) and c), or between steps c) and d).

The conductor clamp assembly 9 may be assembled with the connection flange structure 5 in conjunction with step b) or any time prior to step e).

It should be noted that according to one example, the base member and the support structure may be integrated with the connection flange structure. According to another example, the conductor clamp assembly does not include a support structure or base member, but only a plurality of clamping segments, each clamping segment comprising two halves both provided with the first central channel. The multi-wire conductor may in this case be clamped between pairs of clamping segment halves, each pair of clamping segment halves being arranged one after the other in the axial direction in a similar manner as has been described above. According to one example, in particular one which does not comprise a support structure, subsequent clamping segments may be mechanically connected to each other to prevent relative rotation between the clamping segments. In this case all clamping segments may be axially connected or fixed to each other, thereby preventing relative rotation.

Moreover, there may be examples which do not comprise a connection flange structure and/or support structure. In this case, the conductor clamp assembly may be assembled directly with the lifting head. All of the pulling force/torsional force will in this case be transferred via the multi-wire conductor.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A pull-in head for a high voltage cable provided with a multi-wire conductor having an end portion which is stepped and tapering, with a layer-by-layer exposure of the wires in the direction towards the end face of the multi-wire conductor, wherein the pull-in head comprises:
   a conductor clamp assembly having at least three clamping segments, wherein each clamping segment has an axial first central channel configured to receive the multi-wire conductor, wherein at least some of the clamping segments have mutually differing central channel width dimensions and central channel depth dimensions, the clamping segments being configured to be arranged one after the other in an axial direction of the pull-in head, in an order with a decreasing central channel width dimension and central channel depth dimension, the central channel width dimensions and central channel depth dimensions being adapted to the tapering stepped configuration of the multi-wire conductor, whereby the first central channels together form a multi-wire conductor channel which is tapering in the axial direction, and wherein each clamping segment is configured to provide individual clamping of the multi-wire conductor,
   a hollow lifting head configured to receive the conductor clamp assembly,
   the conductor clamp assembly including a support structure, wherein the clamping segments are configured to be assembled with the support structure to thereby clamp the multi-wire conductor between the clamping segments and the support structure, and
   a plurality of fastening members, each fastening member being configured to attach a respective clamping segment to the support structure.

2. The pull-in head as claimed in claim 1, wherein each clamping segment has a constant central channel width and central channel depth dimension.

3. The pull-in head as claimed in claim 1, wherein the support structure has an inner surface configured to face the clamping segments, the inner surface is provided with an axial second central channel having a stepped structure in the axial direction.

4. The pull-in head as claimed in claim 3, wherein the first central channels and the second central channel define a circumferentially closed channel that is tapering in a stepped manner in the axial direction.

5. The pull-in head as claimed in claim 1, wherein the support structure is provided with a plurality of pairs of lateral radial grooves, each pair of lateral radial groove being configured to mate with a respective clamping segment.

6. The pull-in head as claimed in claim 1, including a connection flange structure having a flange and a collar, wherein the collar is provided with a distal portion relative to the flange and a proximal portion relative to the flange, the distal portion being configured to be soldered to a metal sheet of the high voltage cable, and the proximal portion being configured to be welded to armor wires of the high voltage cable.

7. The pull-in head as claimed in claim 6, wherein the lifting head has a base configured to be assembled with the connection flange structure.

8. The pull-in head as claimed in claim 7, having a sealing member configured to provide a water-tight sealing between the connection flange structure and the lifting head.

9. The pull-in head as claimed in claim 8, wherein the sealing member is an O-ring.

10. An assembly comprising:
    a high voltage cable having the multi-wire conductor which at one end is arranged in a stepped tapering manner, with a layer-by-layer exposure of the wires in the direction towards the end face of the multi-wire conductor, and
    the pull-in head as claimed in claim 1, wherein the pull-in head is mounted to that end portion of the high voltage cable which is provided with the multi-wire conductor with the stepped tapering configuration.

11. A method of assembling a pull-in head with a high voltage cable having a multi-wire conductor, wherein the method includes:
    providing a conductor clamp assembly around the multi-wire conductor, the multi-wire conductor has a stepped tapering configuration in an axial direction of the high voltage cable to expose layer for layer wires of the multi-wire conductor in a stepped manner in the direction towards the end face of the multi-wire conductor,
    wherein the conductor clamp assembly includes at least three clamping segments, each clamping segment having an axial first central channel configured to receive the multi-wire conductor, wherein at least some of the clamping segments have mutually differing central channel width and central channel depth dimensions, the clamping segments being configured to be arranged one after the other in an axial direction of the pull-in head in an order with a decreasing central channel width and central channel depth dimension in the axial direction of the pull-in head, wherein the first central channels together form a multi-wire conductor channel which is tapering in the axial direction of the pull-in head, and wherein the conductor clamp assembly includes support structure,
    wherein in the step of providing the conductor clamp assembly, the multi-wire conductor is along its stepped tapering configuration arranged in the first central channels of corresponding central channel width and central channel depth dimensions,
    fixating the clamping segments to each layer of wires of the multi-wire conductor, the clamping segments being assembled with the support structure to thereby clamp the multi-wire conductor between the clamping segments and the support structure,
    providing a hollow lifting head around the conductor clamp assembly, and
    providing a plurality of fastening members, each fastening member being configured to attach a respective clamping segment to the support structure.

12. The method as claimed in claim 11, further comprising the steps of:
    providing a connection flange structure around the end portion of the high voltage marine cable, the connection flange structure having a flange, and a collar provided with a distal portion relative to the flange and a proximal portion relative to the flange,
    soldering a metal sheet of the high voltage cable to the distal portion, and
    welding armor wires of the high voltage cable to the proximal portion,
    wherein the step of providing the hollow lifting head further includes assembling the lifting head with the connection flange structure in a water-tight manner.

13. The method as claimed in claim 12, wherein the step of providing the hollow lifting head involves placing a sealing member between the connection flange structure and the lifting head.

14. The method as claimed in claim 12, wherein the step of fixating the clamping segments is performed after the step of providing the conductor clamp assembly but before the step of soldering the metal sheet.

15. A pull-in head for a high voltage cable provided with a multi-wire conductor having an end portion which is stepped and tapering, with a layer-by-layer exposure of the wires in the direction towards the end face of the multi-wire conductor, wherein the pull-in head comprises:
- a conductor clamp assembly having at least three clamping segments, wherein each clamping segment has an axial first central channel configured to receive the multi-wire conductor, wherein at least some of the clamping segments have mutually differing central channel width dimensions and central channel depth dimensions, the clamping segments being configured to be arranged one after the other in an axial direction of the pull-in head, in an order with a decreasing central channel width dimension and central channel depth dimension, the central channel width dimensions and central channel depth dimensions being adapted to the tapering stepped configuration of the multi-wire conductor, whereby the first central channels together form a multi-wire conductor channel which is tapering in the axial direction, and wherein each clamping segment is configured to provide individual clamping of the multi-wire conductor,
- a hollow lifting head configured to receive the conductor clamp assembly, the hollow lifting head having a tip with a fastener to which a connector is connectable for pulling the high voltage cable,
- the conductor clamp assembly including a support structure, wherein the clamping segments are configured to be assembled with the support structure to thereby clamp the multi-wire conductor between the clamping segments and the support structure, and
- a plurality of fastening members, each fastening member being configured to attach a respective clamping segment to the support structure.

16. A method of assembling a pull-in head with a high voltage cable having a multi-wire conductor, wherein the method includes:
- providing a conductor clamp assembly around the multi-wire conductor, the multi-wire conductor has a stepped tapering configuration in an axial direction of the high voltage cable to expose layer for layer wires of the multi-wire conductor in a stepped manner in the direction towards the end face of the multi-wire conductor,
- wherein the conductor clamp assembly includes at least three clamping segments, each clamping segment having an axial first central channel configured to receive the multi-wire conductor, wherein at least some of the clamping segments have mutually differing central channel width and central channel depth dimensions, the clamping segments being configured to be arranged one after the other in an axial direction of the pull-in head in an order with a decreasing central channel width and central channel depth dimension in the axial direction of the pull-in head, wherein the first central channels together form a multi-wire conductor channel which is tapering in the axial direction of the pull-in head, and wherein the conductor clamp assembly includes support structure,
- wherein in the step of providing the conductor clamp assembly, the multi-wire conductor is along its stepped tapering configuration arranged in the first central channels of corresponding central channel width and central channel depth dimensions,
- fixating the clamping segments to each layer of wires of the multi-wire conductor, the clamping segments being assembled with the support structure to thereby clamp the multi-wire conductor between the clamping segments and the support structure,
- providing a hollow lifting head around the conductor clamp assembly, the hollow lifting head having a tip with a fastener to which a connector is connectable for pulling the high voltage cable, and
- providing a plurality of fastening members, each fastening member being configured to attach a respective clamping segment to the support structure.

* * * * *